United States Patent [19] [11] 4,259,225
Saito et al. [45] Mar. 31, 1981

[54] COLORED POLYVINYL CHLORIDE PASTE COMPOSITION PREPARED USING PREMIXTURE OF PIGMENT AND AROMATIC CARBOXYLIC ACID ESTER

[75] Inventors: Isamu Saito, Toda; Koshiki Aoyagi, Ohmiya; Masatoshi Okumura, Kawaguchi; Masayoshi Banba, Ageo; Naoki Shibahara, Takaishi, all of Japan

[73] Assignee: Dainippon Ink & Chemicals, Inc., Tokyo, Japan

[21] Appl. No.: 8,589

[22] Filed: Feb. 1, 1979

[30] Foreign Application Priority Data

Feb. 3, 1978 [JP] Japan .................................. 53-10518

[51] Int. Cl.$^3$ .......................... C08K 5/12; C08K 9/04; C09D 17/00
[52] U.S. Cl. ................................................. 260/31.8 B
[58] Field of Search .................................. 260/31.8 B

[56] References Cited

U.S. PATENT DOCUMENTS

| | | | |
|---|---|---|---|
| 2,327,128 | 8/1943 | Renfrew et al. | 260/31.8 B |
| 3,842,027 | 10/1974 | Richardson | 260/31.8 B |
| 3,956,220 | 5/1976 | Riem et al. | 260/31.8 B |
| 4,012,357 | 3/1977 | Foulks, Jr. et al. | 260/31.2 R |
| 4,012,438 | 3/1977 | Lavigne | 260/31.8 B |
| 4,020,040 | 4/1977 | Kattoh et al. | 260/42.56 |

*Primary Examiner*—Joseph L. Schofer
*Assistant Examiner*—Peter F. Kulkosky
*Attorney, Agent, or Firm*—Sherman & Shalloway

[57] ABSTRACT

A colored polyvinyl chloride paste composition comprising (A) a polyvinyl chloride paste, and
(B) a powdery coloring agent comprising (1) a pigment and (2) a monomeric ester of an aromatic carboxylic acid, said ester containing 1 to 6 ester bonds (—COO—) in the molecule and having a melting point of at least 40° C.

12 Claims, No Drawings

COLORED POLYVINYL CHLORIDE PASTE COMPOSITION PREPARED USING PREMIXTURE OF PIGMENT AND AROMATIC CARBOXYLIC ACID ESTER

This invention relates to a colored vinyl paste composition, and more specifically, to a colored polyvinyl chloride paste composition comprising a polyvinyl chloride paste and a powdery coloring agent. The invention also pertains to a powdery coloring agent for coloring a normally liquid polyvinyl chloride paste which is used for paste processing.

In the past, a paste-like coloring agent obtained by mixing a pigment with a normally liquid dispersing medium used for the preparation of a polyvinyl chloride paste, typically a plasticizer such as di-2-ethylhexylphthalate (DOP), di-n-octyl phthalate (DnOP), butyl benzyl phthalate (BBP), dioctyl adipate (DOA), and diisodecyl phthalate (DIDP) has been the only coloring agent used commercially for polyvinyl chloride pastes. However, this paste-like coloring agent has so poor storage stability that on storage for about a month, the pigment separates from the plasticizer, and the coloring agent becomes useless. Its handling during processing is also inconvenient. When storage stability and handlability are considered, it is natural that powdery coloring agents should be preferred to paste-like coloring agents. In coloring a polyvinyl chloride paste with powdery coloring agents, the coloring agents are required not to impair the flowability and physical properties of the polyvinyl chloride paste. For this purpose, the powdery coloring agents should fully meet the following requirements.

(1) The pigment particles should be able to be dispersed in the polyvinyl chloride paste at a temperature of not more than 30° C.

(2) The pigment particles should be able to be dispersed in the polyvinyl chloride paste without exerting such a strong shearing force as to generate heat.

(3) They should not affect the final properties of the polyvinyl chloride paste.

Various powdery coloring agents which have previously been used suitably in solid polyvinyl chloride compositions (powders or pellets) or solution-form vinyl-type paints cannot be utilized because they are scarcely dispersible in polyvinyl chloride paste. Powdery coloring agents for solid polyvinyl chloride, for example the "dry color" comprising a metal soap as a carrier for a pigment or the one comprising a low-molecular-weight polyalkylene and a liquid plasticizer as a carrier for a pigment which is disclosed in Japanese Patent Publication No. 13681/60, and powdery coloring agents for paints, for example the one comprising a vinyl chloride copolymer and a ketone resin as a carrier for a pigment which is disclosed in U.S. Pat. No. 4,020,040 do not disperse in the polyvinyl chloride paste.

It is an object of this invention therefore to provide a colored polyvinyl chloride paste at low cost by discovering a powdery coloring agent which meets the aforesaid various requirements of coloring agents for use in polyvinyl chloride paste.

The present inventors made various investigations on the basis of the information that a substance which is solid at ordinary temperatures and has good solubility in a dispersing medium for a vinyl chloride paste at room temperature is desirable as a carrier for pigments. These investigations led to the discovery that certain monomeric esters of aromatic carboxylic acids exhibit a superior effect when dispersing pigments in a polyvinyl chloride paste.

Thus, according to this invention, there is provided a colored polyvinyl chloride paste composition formed by mixing (A) a polyvinyl chloride paste with (B) a powdery coloring agent composed of (1) a pigment and (2) an aromatic carboxylic acid (monomeric) ester having a melting point of at least 40° C. and containing 1 to 6 ester bonds (—COO—) in the molecule.

The polyvinyl chloride paste (A), as referred to in the present invention, is known as a polyvinyl chloride plastisol, organosol, plastigel, organogel, etc. These polyvinyl chloride pastes are disclosed in detail in C. E. Schildknecht, "Polymer Processes", Vol. X (1956), Interscience Publishers Inc., New York, N.Y., U.S.A. and E. Iida, "Vinyl Paste Processing" [1968 (Vol. 1), 1973 (Vol. 2)], Rubber Digest Company, Tokyo, Japan with regard to starting materials, physical and chemical properties, examples of application, and processing methods. Briefly stated, the plastisol is prepared by dispersing polyvinyl chloride of paste grade having a particle diameter of 0.2 to 9 microns (commercially 0.2 to 2 microns) in a plasticizer of an amount sufficient to form a liquid. The organosol is prepared by adding an organic solvent or a diluent to the plastisol to reduce its viscosity. The plastigel and the organogel are prepared by adding a small amount of a gelling agent to the plastisol and the organosol, respectively. Depending upon end uses, various other ingredients including a stabilizer and a filler are added to the plastisol, organosol, plastigel and organogel. These polyvinyl pastes are flowable at ordinary temperatures, but when they are heated, the plasticizer is dissolved and absorbed in the polyvinyl chloride, and the resin is gelled and melted. Thus, they become a homogeneous solid. By utilizing these properties, various articles typified by canvases, PVC-coated steel sheets, artificial leathers, wall materials, flooring materials, and automotive parts are produced from these polyvinyl chloride pastes by various processing method such as casting, coating, dipping, slush molding and rotational molding.

The term "polyvinyl chloride", as referred to herein, denotes not only a homopolymer of vinyl chloride, but also vinyl chloride copolymers derived from vinyl chloride and other monomers such as vinyl acetate, vinylidene chloride, vinyl alkyl ethers, maleic esters or fumaric esters and mixtures of the polyvinyl chloride with less than 20% of other resins such as hydrocarbon resins, acrylic resins, rosin ethers, abietic acid and abietic acid derivatives.

The monomeric aromatic carboxylate (2) used in this invention denotes an aromatic carboxylic acid ester not containing a recurring unit in the molecule and having a molecular weight not exceeding 1,000, preferably a molecular weight of 190 to 900. One to six ester bonds (—COO—) present in this aromatic carboxylate may be formed by known esterification methods such as a carboxylic acid method, an acid halide method and an ester-interchange method.

The monomeric aromatic carboxylate (2) having 1 to 6 ester bonds (—COO—) and a melting point of at least 40° C. include (2') esters of aromatic monocarboxylic acids such as benzoic acid or naphthoic acid and (2") esters of aromatic polycarboxylic acids such as orthophthalic acid, isophthalic acid, terephthalic acid, trimellitic acid and pyromellitic acid.

The monomeric aromatic monocarboxylate (2') having 1 to 6 ester bonds and a melting point of at least 40° C. is derived from an aromatic monocarboxylic acid, preferably benzoic acid, and a compound containing 1 to 6 hydroxyl groups and having a molecular weight of not more than 300. Examples of the hydroxy-containing compounds are phenolic compounds and alcoholic compounds. The phenolic compounds include phenol, hydroquinone, and bisphenol optionally having 1 to 4 alkyl groups (usually $C_1-C_8$ alkyl groups) or halogen atoms (usually chlorine or bromine) as a substituent. Specific non-limitative examples are phenol, hydroquinone, bisphenol A, cresol, butylphenol, 2-ethylhexylphenol, chlorophenol, dimethylphenol, dibutylphenol, and dichlorophenol. Examples of the alcoholic compounds are alicyclic mono-alcohols typified by cyclohexanol; $C_1-C_8$ aliphatic diols typified by ethylene glycol, butylene glycol, neopentyl glycol, hexanediol and octanediol; alicyclic diols typified by cyclohexanediol; aliphatic triols typified by glycerol and trimethylolethane; and polyhydric alcohols such as pentaerythritol, dipentaerythritol and sorbitol.

The monomeric aromatic polycarboxylate (2'') containing 2 to 6 ester bonds and having a melting point of at least 40° C. is derived from an aromatic polycarboxylic acid and a compound containing one hydroxyl group and having a molecular weight of not more than 300. Such a hydroxy-containing compound includes, for example, alicyclic monoalcohols typified by cyclohexanol; and phenol optionally having 1 to 4 alkyl groups (usually $C_1-C_8$ alkyl groups) or halogen atoms (usually chlorine or bromine) as a substituent. These compounds are used either singly or as a mixture of two or more. Specific non-limitative examples include cyclohexanol, phenol, cresol, butylphenol, chlorophenol, dichlorophenol, bromophenol, and dibromophenol.

Of the monomeric aromatic polycarboxylate (2''), ortho-phthalic acid esters and trimellitic acid esters are especially preferred because they permit smooth dispersing of pigments in the vinyl chloride paste.

When the monomeric aromatic carboxylate contains a free carboxyl or hydroxyl group in the molecule, a powdery coloring agent prepared by using it sometimes has poor storage stability or a reduced effect of dispersing the pigment in the vinyl chloride paste. Accordingly, it is desirable to avoid using aromatic carboxylic acid esters having such a free group.

From the viewpoint of the ease of dispersion of pigments in vinyl chloride pastes, specific examples of suitable monomeric aromatic carboxylic acid esters having a melting point of at least 40° C. include phenyl benzoate, cresyl benzoate, ethylphenyl benzoate, butylphenyl benzoate, chlorophenyl benzoate, dichlorphenyl benzoate, cyclohexyl benzoate, bisphenol A dibenzoate, ethylene glycol dibenzoate, butylene glycol dibenzoate, pentyl glycol dibenzoate, hexanediol dibenzoate, cyclohexanediol dibenzoate, glycerol tribenzoate, trimethylolethane tribenzoate, pentaerythritol hexabenzoate, sorbitol hexabenzoate, dicyclohexyl phthalate, diphenyl phthalate, dicresyl phthalate, di-(butyl phenyl) phthalate, di-(chlorophenyl) phthalate, di-(chlorophenyl) phthalate, di-(bromophenyl) phthalate, cresyltrimethylphenyl phthalate, cyclohexylphenyl phthalate, tricyclohexyl trimellitate, and tetracyclohexyl pyromellitate. Among these, ethylene glycol dibenzoate, 1,4-butylene glycol dibenzoate, neopentyl glycol dibenzoate, 1,6-hexanediol dibenzoate, cyclohexanediol dibenzoate, glycerin, tribenzoate, trimethylolethane tribenzoate, pentaerythritol tetrabenzoate, dicyclohexyl phthalate, diphenyl phthalate and tricyclohexyl trimellitate are preferred because they have an effect of increasing the thermal stability of vinyl chloride pastes in addition to imparting ease of dispersion of pigments in the vinyl chloride pastes.

The aromatic carboxylic acid esters are used either singly or as a mixture of two or more.

Benzoic acid esters are advantageous over the other aromatic carboxylic acid esters because esters having a melting point of at least 40° C. can be prepared from alcohols of low cost. They are also advantageous in the production of coloring agents because when they are mixed in the liquid state with pigments and then cooled for pulverization, they solidify within a relatively short period of time.

When the aromatic carboxylic acid ester has a melting point of less than 40° C., the resulting powdery coloring agent undergoes blocking during storage, and causes difficulty in practical application. Since the aromatic carboxylic acid ester used in this invention contains an aromatic ring and ester bonds in the molecule, it permits easy dispersion of the polyvinyl chloride paste in a dispersing medium. Moreover, since its compatibility with polyvinyl chloride resins is good, it is prevented from bleeding or blooming from fabricated articles of polyvinyl chloride. On the other hand, aliphatic polycarboxylic acid esters having a melting point of at least 40° C. are difficultly soluble in dispersing media for the polyvinyl chloride paste and have poor compatibility with the polyvinyl chloride resins, and therefore, tend to bleed out or bloom from the fabricated articles. Accordingly, these aliphatic carboxylates are unsuitable as a pigment carrier in the powdery coloring agent of this invention.

The pigment (1) is not particularly limited, and ordinary organic pigments such as monoazo pigments, disazo pigments, condensed azo pigments, azo lake pigments, phthalocyanine pigments, quinacridone pigments and carbon blacks, and ordinary inorganic pigments such as red iron oxide, titanium dioxide, yellow lead and cadmium pigments can be used.

The proportions of the pigment (1) and the monomeric aromatic carboxylate (2) in the powdery coloring agent (B) are usually 5 to 80% by weight of the pigment and 95 to 20% by weight of the monomeric aromatic carboxylate. When the pigment is an organic pigment, it is preferred that the powdery coloring agent sould consist of 5 to 50% by weight of the pigment and 95 to 50% by weight of the monomeric aromatic carboxylate.

The amount of the powdery coloring agent (B) is usually 0.01 to 25 parts by weight, preferably 0.1 to 20 parts by weight, per 100 parts by weight of the polyvinyl chloride paste.

The powdery coloring agent (B) may further contain additives such as plasticizers, dispersing agents and modifiers in amounts which do not adversely affect the performance of the resulting powdery coloring agent and the properties and appearance of articles prepared from polyvinyl chloride paste.

In particular, replacing a part of the monomeric aromatic carboxylate by a plasticizer in an amount which does not cause blocking of the powdery coloring agent during storage is preferred because it will improve the dispersibility of the powdery coloring agent in the polyvinyl chloride paste. It is advisable however to limit the amount of such a plasticizer to not more than 35% by weight, preferably not more than 30% by weight, based on the amount of the carboxylate. If the amount exceeds this limit, the powdery coloring agent tends to undergo blocking. The plasticizer used for this purpose is liquid at ordinary temperatures. Any liquid plasticizers which can be used as plasticizers for polyvinyl chloride paste can be used, and typical examples include phthalic acid esters, linear aliphatic dibasic acid esters, phosphoric acid esters, epoxy-type plasticizers, polyester-type plasticizers, and chlorinated paraffin.

When during the manufacture of the powdery coloring agent, the mixture of the ingredients is difficult to knead because of its low viscosity or a sufficient shearing force is not exerted, the addition of several percent, based on the weight of the aromatic carboxylate, of a substance having compatibility with the ester, such as a fine powdery acrylic polymer (for example, "ACRYACE PA 20", a trademark for a product of Kanegafuchi Chemical Co., Ltd.) will solve these problems.

The powdery coloring agent (B) is prepared by kneading the pigment, the monomeric aromatic carboxylate and optional additives (for example, plasticizers) under heat by a three-roll mill, a mixer or the like, cooling the kneaded mixture to solidify it, and then pulverizing the solid mixture; or by stirring a wet cake of the pigment, the monomeric aromatic carboxylate and optional additives under heat, flashing the mixture, removing the liberated water, drying it, and then pulverizing it. The powdery coloring agent (B) obtained by pulverization usually has a particle diameter of 10 to 120 mesh.

The colored vinyl chloride paste composition of this invention comprising the polyvinyl chloride paste (A) and the powdery coloring agent (B) can be prepared by mixing the polyvinyl chloride paste (A) with the powdery coloring agent (B). If desired, it is possible to add the powdery coloring agent (B) to the mixture obtained at any stage of the process of preparing the polyvinyl chloride paste (A) by mixing polyvinyl chloride of paste grade, a liquid plasticizer and optionally, additives such as a filler, a stabilizer, a gelling agent, and a diluent, and mixing them. A mixer having a high shearing force is unsuitable for the mixing of the polyvinyl chloride paste with the powdery coloring agent, and the stirring can be sufficiently effected by a grinder, a ponymixer or a homomixer.

The following Examples and Comparative Examples specifically illustrate the present invention. All parts are by weight.

EXAMPLE 1

Fifty parts of ethylene glycol dibenzoate (melting point 76° C.) was well mixed with 50 parts of yellow lead, and the mixture was kneaded three times on a three-roll mill heated at 80° C. The kneaded mixture was cooled, and then pulverized by an atomizer equipped with a screen having a diameter of 1 mm. The particles were passed through a 60-mesh sieve to form 95 parts of a powdery coloring agent.

EXAMPLE 2

A powdery coloring agent was prepared from 50 parts of neopentyl glycol dibenzoate (melting point 53° C.) and 50 parts of yellow lead by the same operation as in Example 1.

EXAMPLE 3

A powdery coloring agent was prepared from 50 parts of 1,4-butylene glycol dibenzoate (melting point 81° C.) and 50 parts of yellow lead by the same operation as in Example 1.

EXAMPLE 4

A powdery coloring agent was prepared from 50 parts of dicyclohexyl phthalate (melting point 65° C.) and 50 parts of yellow lead by the same operation as in Example 1.

COMPARATIVE EXAMPLE 1

A powdery coloring agent was prepared from 50 parts of glycerol monobenzoate (melting point 36° C.) and 50 parts of yellow lead by the same operation as in Example 1.

COMPARATIVE EXAMPLE 2

This example shows a conventional powdery coloring agent.

Twenty parts of polyethylene wax having an average molecular weight of 5,000, 30 parts of DOP and 50 parts of yellow lead were well mixed, and kneaded four times on a three-roll mill heated at 120° C. The kneaded mixture was cooled, pulverized, and passed through a 60-mesh sieve to form a powdery coloring agent.

COMPARATIVE EXAMPLE 3

This example shows another conventional powdery coloring agent.

Fifty parts of calcium stearate and 50 parts of yellow lead were well mixed, micro-pulverized, and passed through a 60-mesh sieve to form a powdery coloring agent.

COMPARATIVE EXAMPLE 4

Fifty parts of DOP and 50 parts of yellow lead were kneaded four times on a three-roll mill to form a paste coloring agent (a conventional paste coloring agent).

The storage stabilities of the coloring agents prepared in Examples 1 to 4 and Comparative Examples 1 to 4 were determined. Plastisols colored with these coloring agents were subjected to the various tests described below. The results are shown in Table 1.

The testing methods were as follows:

(1) Storage stability of coloring agents

The coloring agent was stored at 40° C. for a month, and observed with unaided eyes.

(2) Dispersibility of the coloring agent

Five parts of the coloring agent was added to 100 parts of plastisol, and the mixture was stirred by a ponymixer. The dispersed condition was observed every other minute after the start of the stirring, and the time (minutes) which elapsed until there was no color spot or streak of the coloring agent was measured. The plastisol used consisted of 100 parts of polyvinyl chloride resin of the paste grade ("Zeon 121," a product of Nippon Zeon Co., Ltd.), 80 parts of DOP and 2 parts of a Ba/Zn type stabilizer.

(3) Viscosity of the plastisol containing the coloring agent

A colored plastisol was prepared by adding the same proportion of the coloring agent as described in (2) above, and was allowed to stand at 30° C. for 1 day and 7 days respectively. The viscosity of the plastisol was then measured by a B-type viscometer (model BM).

(4) Properties of a sheet prepared from the colored plastisol

The same colored plastisol as obtained in (2) was cast in a mold, and heated at 180° C. for 10 minutes to form a sheet having a thickness of 1 mm. The following properties of the sheet were measured.

JIS hardness: measured in accordance with JIS K6301.

Tensile strength and break elongation: measured in accordance with JIS K6723.

Occurrence of bloom and bleed out: The sheet was allowed to stand for a year at ordinary temperature, and examined for the occurrence of bleed-out and blooming.

Thermal stability: The sheet was allowed to stand at 170° C. for 30 minutes, and then examined for the tacky condition of the sheet surface.

| -continued | |
|---|---|
| DOP | 87 |
| CaCO₃ (low oil absorbing) | 55 |
| CaCO₃ (high oil absorbing) | 12 parts |
| Stabilizer (Ba/Cd type) | 1 |
| Stabilizer (epoxy type) | 6 |

A plastisol of the above formulation was diluted with mineral spirit until its solids content became 90%. To the mixture was added 8 parts of the powder coloring agent, and they were mixed by a mixer. Iron wires heated at 220° C. were dipped in the resulting colored vinyl paste composition to obtain iron wires having a

TABLE 1

| Coloring agent | Storage stability (1) | Dispersibility (2) (minutes) | Viscosity at 30° C. of the colored plastisol (cps) (3) After 1 day | Viscosity at 30° C. of the colored plastisol (cps) (3) After 7 days | JIS hardness | Tensile strength (kg/cm²) | Break elongation (%) | Occurrence of blooming and bleeding | Thermal stability |
|---|---|---|---|---|---|---|---|---|---|---|
| Ex. 1 | No change | 7 | 930 | 1150 | 66 | 143 | 378 | None | Not tacky |
| Ex. 2 | No change | 4 | 970 | 1210 | 65 | 145 | 372 | None | Not tacky |
| Ex. 3 | No change | 10 | 945 | 1230 | 65 | 141 | 383 | None | Not tacky |
| Ex. 4 | No change | 7 | 910 | 1180 | 67 | 150 | 362 | None | Not tacky |
| CEx. 1 | Blocking | 4 | 910 | 1260 | 65 | 138 | 384 | None | Tacky |
| CEx. 2 | No change | Did not disperse | — | — | — | — | — | — | — |
| CEx. 3 | No change | Did not disperse | — | — | — | — | — | — | — |
| CEx. 4 | The pigment separated and sedimented. | 3 | 890 | 1130 | 64 | 142 | 368 | None | Tacky |

In Comparative Examples 2 and 3, the viscosity of the plastisol and the properties of the sheet were not measured because the coloring agent did not disperse in the plastisol.

EXAMPLES 5 TO 8 AND COMPARATIVE EXAMPLE 5

Trimethylolethane tribenzoate (melting point 87° C.), furnace carbon black and DOP or DOA were mixed in the proportions shown in Table 2 by the same operation as in Example 1 to afford powdery coloring agents having a size of 20 mesh.

The storage stabilities of the resulting coloring agents, and their dispersibilities in plastisol were tested by the same methods as described hereinabove, and the results are also shown in Table 2.

TABLE 2

| | Composition (wt. %) of the powdery coloring agent | | | | | |
|---|---|---|---|---|---|---|
| | Carbon black | Aromatic carboxylate | DOP | DOA | Storage stability | Dispersibility (minutes) |
| Ex. 5 | 50 | 50 | — | — | No change | 8 |
| Ex. 6 | 50 | 45 | — | 5 | No change | 7 |
| Ex. 7 | 50 | 40 | 5 | 5 | No change | 5 |
| Ex. 8 | 50 | 35 | 15 | — | No change | 4 |
| CEx. 5 | 50 | 25 | 25 | — | Blocking | 4 |

EXAMPLE 9

Thirty-five parts of glycerol tribenzoate (melting point 71° C.), 5 parts of DOP and 60 parts of titanium dioxide were mixed by the same operation as in Example 1 to form a powdery coloring agent having a size of 20 mesh.

| PVC resin of the paste grade ("Zeon 121") | 100 parts |
|---|---| beautiful colored coating.

When the above procedure was repeated by using cyclohexanediol dibenzoate, pentaerythritol tetrabenzoate or diphenyl phthalate instead of the glycerol tribenzoate, similarly good results were obtained.

EXAMPLE 10

Sixty parts of ethylene glycol dibenzoate and 60 parts of a wet cake (solids content 60%) of phthalocyanine blue were put into a pressure-reduced vessel equipped with a stirrer, and mixed with stirring for 2 hours while they were being heated at 120° to 130° C. by steam under a pressure of 5 kg/cm². Thus, "flashing" was performed whereby an aqueous dispersion of phthalocyanine was replaced by ethylene glycol dibenzoate.

The liberated water was removed by decantation, and the residual water was removed by reducing the pressure. The product was pulverized by the same method as described in Example 1 to afford 95 parts of a powdery coloring agent having a pigment content of 40%.

| PVC resin of paste grade ("Zeon 121") | 100 parts |
|---|---|
| DOP | 40 |
| DBP | 20 |
| Blowing agent (azodicarbonamide) | 3 |
| Stabilizer (Ca/Zn type) | 3 |

Five parts of the resulting powdery coloring agent was added to a plastisol having the above formulation, and they were stirred by a mixer to form a colored paste composition. The composition was coated to a thickness of 0.3 mm on a mold releasing sheet, and heated at 210° C. to give a colored foamed sheet.

EXAMPLE 11

Seventy parts of neopentyl glycol dibenzoate and 30 parts of furnace carbon black were well mixed, and kneaded four times on a three-roll mill heated at 110° C. The kneaded mixture was cooled, pulverized by an atomizer equipped with a screen having a diameter of 1.5 mm, and passed through a 30-mesh sieve to afford 87 parts of a powdery coloring agent.

| | |
|---|---|
| PVC resin of paste grade ("Zeon 121") | 100 parts |
| DOP | 45 |
| DOA | 20 |
| Epoxidized vegetable oil | 10 |
| Surface-treated CaCO₃ | 50 |
| Stabilizer (dibasic lead phosphite) | 3 |

To a plastisol having the above formulation was added 3 parts of the resulting powdery agent, and they were stirred by a mixer to form a colored vinyl paste composition. The composition was knife-coated on a film, and heated at 220° C. to form a sheet having the pigment dispersed therein beautifully.

EXAMPLE 12

Forty parts of 1,6-hexanediol dibenzoate (melting point 53° C.) was well mixed with 60 parts of titanium dioxide, and they were well kneaded by a three-roll mill heated at 70° C. The kneaded mixture was cooled to −10° C., and pulverized to afford a powdery coloring agent having an average particle diameter of 20 mesh.

| | |
|---|---|
| PVC resin of paste grade ("Sumilit PX-A", a trademark for a product of Sumitomo Chemical Co., Ltd.) | 100 parts |
| n-DOP | 70 |
| Epoxidized soybean oil | 4 |
| CaCO₃ | 10 |
| Stabilizer (Ca/Zn type) | 3 |
| Stabilizer (organotin mercaptide type) | 0.3 |

To a plastisol having the above formulation was added 7 parts of the resulting powdery coloring agent, and they were stirred by a mixer to form a colored vinyl paste having the pigment uniformly dispersed therein. Rain shoes were made by slush molding of the resulting paste at 230° C.

What we claim is:

1. A colored polyvinyl chloride paste composition comprising
    (B) a powdery premixture of (1) a pigment and (2) an aromatic carboxylic acid ester monomer which does not contain any recurring units in its molecular structure, said ester containing 1 to 6 ester bonds (—COO—) per molecule, having a molecular weight not exceeding 1,000 and having a melting point of at least 40° C., said powdery premixture being uniformly dispersed in
    (A) a polyvinyl chloride paste selected from the group consisting of plastisol, organosol, plastigel and organogel.

2. The composition of claim 1 wherein the premixture (B) comprises 5 to 80% by weight of the pigment (1) and 95 to 20% by weight of the aromatic carboxylic acid ester (2).

3. The composition of claim 1 wherein the aromatic carboxylic acid ester (2) is a benzoate, phthalate, trimellitate or pyromellitate.

4. The composition of claim 2 wherein the aromatic carboxylic acid ester (2) is a benzoate.

5. The composition of claim 2 wherein the aromatic carboxylic acid ester (2) is a phthalate.

6. The composition of claim 2 wherein the aromatic carboxylic acid ester (2) is a trimellitate.

7. A colored polyvinyl chloride paste composition prepared by mixing (1) a pigment with (2) an aromatic carboxylic acid ester not containing a recurring unit in the molecule, said ester containing 1 to 6 ester bonds (—COO—) in the molecule, having a molecular weight not exceeding 1,000 and having a melting point of at least 40° C., mixing the resulting powdery coloring agent (B) with a polyvinyl chloride paste (A) selected from the group consisting of plastisol, organosol, plastigel and organogel and uniformly dispersing the pigment.

8. The colored polyvinyl chloride paste composition of claim 1 wherein the aromatic carboxylic acid ester monomer is selected from the group consisting of ethylene glycol dibenzoate, 1,4-butylene glycol dibenzoate, neopentyl glycol dibenzoate, 1,6-hexanediol dibenzoate, cyclohexanediol dibenzoate, glycerin tribenzoate, trimethylolethane tribenzoate, pentaerythritol tetrabenzoate, dicyclohexyl phthalate, diphenyl phthalate and tricyclohexyl trimellitate.

9. The colored polyvinyl chloride paste composition of claim 1 wherein the premixture (B) comprises 5 to 50% by weight of an organic pigment and 95 to 50% by weight of the aromatic carboxylic acid ester monomer.

10. The colored polyvinyl chloride paste composition of claim 1 which comprises from 0.01 to 25 parts by weight of the premixture (B) per 100 parts by weight of the polyvinyl chloride paste.

11. The colored polyvinyl chloride paste composition of claim 1 which comprises from 0.1 to 20 parts by weight of the premixture (B) per 100 parts by weight of the polyvinyl chloride paste.

12. The colored polyvinyl chloride paste composition of claim 1 wherein the premixture (B) further comprises not more than 35% by weight, based on the amount of the aromatic carboxylic acid ester of a liquid plasticizer for the polyvinyl chloride paste.

* * * * *